(12) United States Patent
Bardowell

(10) Patent No.: US 8,886,564 B2
(45) Date of Patent: Nov. 11, 2014

(54) PROGRAM FOR RESOURCE SECURITY IN A DATABASE MANAGEMENT SYSTEM

(75) Inventor: Randolph Bardowell, Burlington, NJ (US)

(73) Assignee: CA, Inc., New York, NY (US)

( * ) Notice: Subject to any disclaimer, the term of this patent is extended or adjusted under 35 U.S.C. 154(b) by 1480 days.

(21) Appl. No.: 12/211,353

(22) Filed: Sep. 16, 2008

(65) Prior Publication Data

US 2010/0071067 A1    Mar. 18, 2010

(51) Int. Cl.
*G06F 21/00* (2013.01)
*G06F 21/62* (2013.01)

(52) U.S. Cl.
CPC .................................. *G06F 21/6227* (2013.01)
USPC .......................................................... 705/51

(58) Field of Classification Search
CPC ........................................................ G06F 21/10
USPC .......................................................... 705/51
See application file for complete search history.

(56) References Cited

U.S. PATENT DOCUMENTS

| | | | |
|---|---|---|---|
| 6,105,043 A * | 8/2000 | Francisco et al. | 715/234 |
| 2004/0163073 A1 * | 8/2004 | Krzyzanowski et al. | 717/107 |
| 2004/0221262 A1 * | 11/2004 | Hampapuram et al. | 717/113 |
| 2004/0254914 A1 * | 12/2004 | Polizzi | 707/3 |
| 2005/0049869 A1 * | 3/2005 | Bache | 704/254 |
| 2006/0168436 A1 * | 7/2006 | Campbell et al. | 713/1 |
| 2007/0169071 A1 * | 7/2007 | Martin et al. | 717/166 |

OTHER PUBLICATIONS

Bekman et al., "Practical mod_perl," May 2003, O'Reilly & Associates, Inc., First Edition, all pages.*
Apache Week, Jan. 1999, Issue 144, all pages.*

* cited by examiner

*Primary Examiner* — Jacob C. Coppola
(74) *Attorney, Agent, or Firm* — Myers Bigel Sibley & Sajovec, P.A.

(57) ABSTRACT

An inventive method is presented for resource security in a database management system having a plurality of resources, the method comprising creating a macro and a corresponding data section definition (DSECT) defining security for each resource, assembling all of the DSECTs into a load module, processing the load module to obtain source code, and assembling the source code, such that changing the source code of one resource modifies the defined security of the resource and adding new source code to the source code adds a new resource having security to the plurality of resources. The processing step can comprise loading the load module, reading a DSECT having a total number of resources, and, for each resource of the total number of resources, reading a next DSECT, finding the defined security in the next DSECT, and obtaining the source code associated with the defined security.

8 Claims, 2 Drawing Sheets

PROGRAM FOR RESOURCE SECURITY IN A DATABASE MANAGEMENT SYSTEM

FIELD OF THE INVENTION

The present invention relates generally to database security, and more specifically to a system and method for resource security in a database management system.

BACKGROUND OF THE INVENTION

A database management system (DBMS) is a suite of programs which typically manage large structured sets of data, offering ad hoc query facilities to many users. A DBMS is an extremely complex set of software programs that controls the organization, storage and retrieval of data (fields, records and files) in a database, as well as controlling the security and integrity of the database and its data. The DBMS accepts requests for data from one or more application programs and instructs the operating system to transfer the appropriate data. With a DBMS, information systems can be modified much more easily as the organization's information requirements change. For example, new categories of data can be added to the database without disrupting the existing system.

A DBMS can employ a variety of data organizational techniques, including hierarchical, network, and relational structures, as well as inverted lists, and the DBMS's organization is not limited to only one approach. Hence, a DBMS can include navigational and/or relational (SQL) databases, as well as an Application Development System (ADS) which interfaces with user programs such as Cobol. Internet access can be provided to a DBMS using, for example, JDBC and ODBC standards. These systems can be run on a variety of operating systems, including z/OS, VSE and BS2000. Examples of DBMS applications include computerized library systems, flight reservation systems, computerized parts inventory systems, personnel systems, etc.

Security is a primary concern in any DBMS. Data security prevents unauthorized users from viewing or updating the database. Users are allowed access to the entire database or subsets of the database, called subschemas, typically using passwords. The DBMS can further maintain the integrity of the database by not allowing more than one user to update the same record at the same time and/or by preventing the entry of duplicate records, that is, records with identical data or identical key fields.

The various capabilities or resources, including a task, such as search, sort, compile, an activity, a program, a system program, sign on, and sign off, etc., contained in the DBMS must also be secured to maintain the integrity of the database. For example, in one well-known DBMS, security of these resources is controlled through a table load module that indicates what resources are secured, and, if a resource is secured, whether the security is provided internally or externally to the DBMS. Access to resources that are externally secured can be controlled by security systems such as ACF2, RACF or Top Secret.

Controlling resources through a single table load module enhances security by placing resource security information in one secure location. However, a table load module is difficult to customize, update or amend. Source code, corresponding to the load module, must also be separately maintained, so that additions, deletions, and/or changes to resources, such as changing sign-on security from internal to external, can be made and the source can be re-assembled into an updated load module. Securely maintaining this source code is problematic; even if the code is placed in a secure location, it can be overwritten or inadvertently lost. Thus there is a need for a method for determining and amending a resource's security information in a load module when a change or addition to the resources is desired.

BRIEF SUMMARY OF THE INVENTION

The present invention advantageously provides a method for determining the security information of a resource, and amending this information if necessary. The method for resource security in a database management system having one or more resources comprises creating a macro and a corresponding data section definition (DSECT) defining security for each resource, assembling all of the DSECTs into a load module, processing the load module to obtain source code, and assembling the source code, such that changing the source code of one resource modifies the defined security of the resource and adding new source code to the source code adds a new resource having security to the plurality of resources. The processing step can include loading the load module, reading a DSECT having a total number of resources, and, for each resource of the total number of resources, reading each parameter for each resource from a next DSECT, finding the defined security in the next DSECT, and obtaining the source code associated with the defined security. The source code assembly can comprise converting the source code to macros and corresponding DSECTs and assembling these DSECTs.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution is presented to the need for a method for resource security in a DBMS.

In an exemplary embodiment, a table load module, called RHDCSRTT, comprises security information for resources in a CA IDMS™ DBMS. The RHDCSRTT module is created by assembling a series of assembler macros, called #SECRTT macros, along with corresponding data section definitions. A #SECRTT macro with type INITIAL is the first macro assembled into the RHDCSRTT module, and a #SECRTT macro with type FINAL is the last macro in the module. The remaining macros have type ENTRY or OCCURRENCE. Each #SECRTT macro, other than those of type INITIAL and FINAL, corresponds to a specific resource and contains parameters to describe or define the specific resource, including how it should be secured, e.g., not secured, internally secured, or externally secured. Other parameters can be coded for each macro to provide more detailed information for execution time security checking. These parameters can include resource type, resource class name, and external name such as Activity, Application Name, Database Name, Data Definition Name, Environment, Resource External Name, Resource External Type, Schema, SSName, System, Version, etc.

Figure 1:
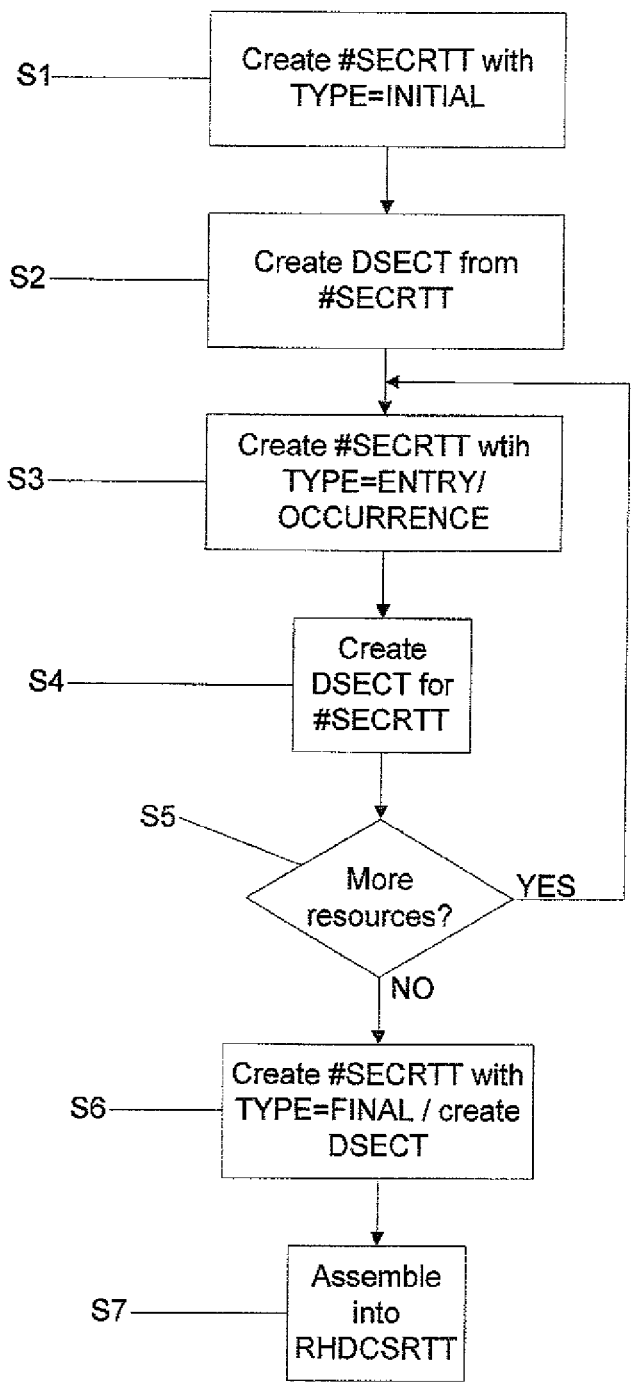
FIG. 1 is a flow diagram illustrating a method for creating a load module in accordance with the disclosure of the present invention.

FIG. 1 illustrates the flow of the process for creating the table load module RHDCSRTT. In step S1, the #SECRTT macro with type INITIAL is created. This macro includes environmental parameters, system and user profile information or parameters, and default information including the total number of resources in the load module. In step S2, the macro is converted into a corresponding data section definition (DSECT) that will be assembled into the RHDCSRTT module. In one embodiment, the DSECT created from the #SECRTT macro with type INITIAL is called SECRTTHD, and the DSECT indicates that the header is INITIAL and the offset is 30.

Next, #SECRTT macros for all resources are created. In step S3, the macro type is set, e.g., TYPE=ENTRY or TYPE=OCCURRENCE, along with the resource name and its parameters. In one embodiment, the #SECRTT macro is known as a security resource type table entry (SECRTTED). In step S4, a DSECT for the #SECRTT macro is created. The program checks for additional resources in step S5. If more resources exist (S5=YES), processing continues at step S3. Otherwise (S5=NO), in step S6 the #SECRTT macro with type FINAL is created, along with its DSECT. In step S7, all of the DSECTs created from the #SECRTT macros are assembled into the RHDCSRTT module.

The simplest description of the RHDCSRTT module is that the readable source, i.e. #SECRTT macros, is converted into a collection of hexadecimal strings with characters 0 through 9 then A through F in any combination. This basically describes the appearance of a load module such as RHDCSRTT.

After its creation, the RHDCSRTT module can be read using its DSECTs. A DSECT can be thought of as a map that can be superimposed over the hexadecimal characters of the RHDCSRTT module to decipher the meaning of the characters. As discussed above, the DSECTs are generated into the RHDCSRTT load module from the #SECRTT source. Each DSECT is similar to a data record.

When a resource needs to be added or changed, the program or routine of the present invention reads the RHDCSRTT module's strings of hexadecimal characters and converts them back to the series of #SECRTT macros from which they were generated. The regenerated source code can then be modified and re-assembled to recreate a new load module with the required changes.

Figure 2:
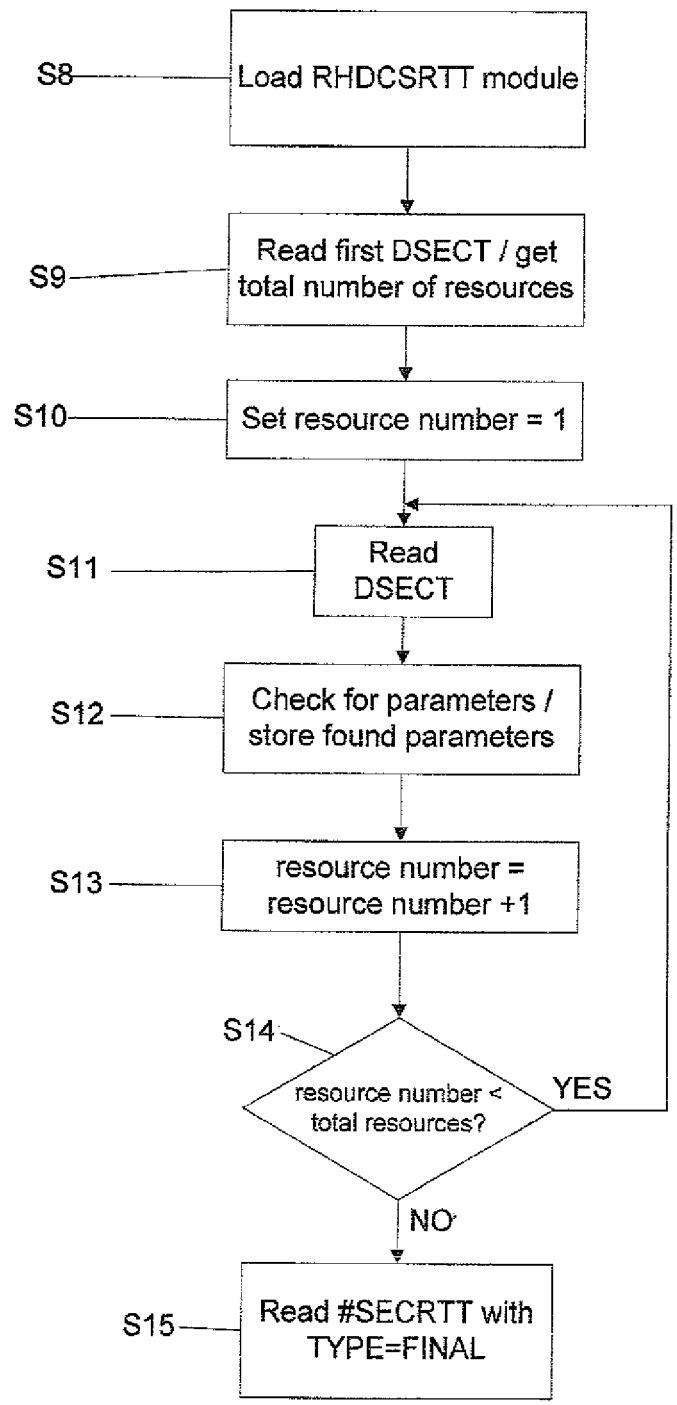
FIG. 2 is a flow diagram illustrating a method for obtaining source code in accordance with the disclosure of the present invention.

FIG. 2 illustrates the flow of the process for regenerating source code from the table load module RHDCSRTT. In step S8, the RHDCSRTT module is loaded. In step S9, the header or first DSECT in RHDCSRTT is read and the total number of resources defined in the RHDCSRTT module is retrieved. As discussed above, this first DSECT is SECRTTHD, which corresponds to #SECRTT TYPE=INITIAL.

In step S10, the resource number is set to one (1). In step S11, the next DSECT, SECRTTED having TYPE=ENTRY or TYPE=OCCURRENCE (or OCCUR) is read. In step S12, the program checks each entry in the DSECT for the parameters available for the resource type of the DSECT, and each parameter that is found is stored in another DSECT created to hold the parameters and flags. The resource number is incremented by one in step S13 and if the incremented resource number is less than the total number of resources (S14=YES), then processing continues at step S11. Otherwise (S14=NO), all of the DSECTs in the load module have been processed. The process concludes in step S15, when the #SECRTT with TYPE=FINAL is read.

The regenerated source code obtained from the process can be modified to add new resources and/or to change the security parameter(s) of one or more existing resources. This modified source code can then be re-assembled to recreate a new load module reflecting the desired changes. The (re-) assembly can be performed as described and shown in FIG. 1.

In one embodiment, the inventive routine to process the load module is embedded in a CA IDMS™ module, e.g. in the #LOOK macro from which IDMSLOOK and RHDCLOOK are assembled. The routine loads the RHDCSRTT module simply by coding the syntax LOOK RHDCSRTT online in IDM S™ from enter next task code, or in batch by specifying in the SYSIPT DD RHDCSRTT.

The following pseudo-code illustrates an embodiment of the present invention.

Load the RHDCSRTT load module.

Read the header SECRTTHD DSECT noting what parameters were coded for the #SECRTT TYPE=INITIAL statement. This statement corresponds to the SECRTTHD DSECT. This DSECT stores additional information such as the number of occurrences of SECRTTED DSECT for each #SECRTT TYPE=ENTRY or #SECRTT TYPE=OCCUR statement. The SECRTTHD DSECT is immediately followed by a series of SECRTTED DSECT's.

Store the parameters coded on #SECRTT TYPE=INITIAL from SECRTTHD to the SRTDSECT DSECT which is working storage for the routine.

Write "#SECRTT TYPE=INITIAL"

IF "ENVNAME=" was coded write a "," after "#SECRTT TYPE=INITIAL" followed by an "X" in column 72 and write "ENVNAME=" on the next line of output.

IF "SGNRETN=" was coded write "," followed by "X" in column 72.

Write "SGNRETN=" parameter on the following line.

IF "SYSPROF=" was coded write "," followed by an "X" in column 72.

Write "SYSPROF=" parameter on the following line.

Write "(" after "SYSPROF=" followed by the option that was coded which could be "OFF", "NULL", "USER", "GROUP", "SYSTEM" or an actual "profile name".

IF "ON" was coded write after the option coded for "SYSPROF=" then write "ON)"

ELSE write ")"

IF USRPROF= was coded write "," followed by "X" in column 72.

Write "USRPROF=" parameter on the following line.

Write "(" after "USRPROF=" followed by the option that was coded which could be "OFF", "NULL", "GROUP", "SYSTEM" or an actual "profile name".

IF "ON" was coded write after the option coded for "USRPROF=" then write

ELSE write ")"

IF "DFLTSGN=YES" was coded write followed by "X" in column 72.

write "DFLTSGN=YES" parameter on the following line.

IF "DFLTUID=" was coded write "," followed by "X" in column 72.

Write "DFLTUID=" parameter on the following line.

IF "(" was coded after DFLTUID then a parameter list of VTAMNODE and/or PTERMID and/or LTERMID was coded.

Write "(VTAMNODE,PTERMID,LTERMID)"

ELSE Write the 'userid' after "DFLTUID=".

IF "EXTRUID=" was coded write "." followed by "X" in column 72.

Write "EXTRUID=userid".

IF "SVCNUM=" was coded write "." followed by "X" in column 72.
  Write "SVCNUM=nnn" where nnn is the SVC number.
  This terminates the #SECRTT TYPE=INITIAL statement.
  The program then goes through a repeated cycle (loop) based on the number of SECRTTED entries in SECRTTHD.

```
IF there is a "#SECRTT TYPE=" for SECRTTED write "#SECRTT TYPE=".
  IF type is ENTRY write "ENTRY"
    IF "RESTYPE=" was coded write "." then write "RESTYPE=restype" where
restype is the actual resource type.
    IF "SECBY=" was coded write "," followed by "X" in column 72 then
      write "SECBY=INT" or "SECBY=EXT" on the following line depending on
whether internal or external was coded.
      IF "SECBY=EXT" was coded check for "EXTCLS="
        IF "EXTCLS=" was coded write "." followed by "X" in column 72.
        Write "EXTCLS=resource-class-name" on the following line.
        IF "EXTNAME=" was coded write "." followed by "X" in column 72.
        Write "EXTCLS=(".
        Write the parameters that were coded separated by commas and end with ")".
  ELSE
    write "OCCUR".
    IF "RESNAME=" was coded write "RESNAME=resource-name".
    IF "RESTYPE=" was coded write "," then "RESTYPE=resource-type"
    IF "EXTCLS=" was coded write "." followed by "X" in column 72.
      Write "EXTCLS=resource-class-name" on the following line.
    IF "EXTNAME=" was coded write "." followed by "X" in column 72.
      Write "EXTCLS=(".
      Write the parameters that were coded separated by commas and end with ")".
ELSE write "#SECRTT TYPE=FINAL"
  Write "END"
```

Various aspects of the present disclosure may be embodied as a program, software, or computer instructions embodied in a computer or machine usable or readable medium, which causes the computer or machine to perform the steps of the method when executed on the computer, processor, and/or machine.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for resource security in a database management system having a plurality of resources, comprising steps of:
  for each resource in the database management system, defining a security for the resource by creating a macro and a corresponding data section definition;
  converting the macros into a collection of hexadecimal strings;
  assembling all of the data section definitions and the converted macros into a load module;
  processing the load module to obtain the macros, the processing comprising steps of:
    reading, from the load module, a first data section definition;
    retrieving, from the first data section definition, a total number of resources; and
    for each resource of the total number of resources:
      reading a next data section definition;
      finding the defined security in the next data section definition; and
      generating the macro associated with the defined security; and
  after processing the load module, modifying the macros obtained through the generating the macro operations by performing at least one of: changing the macro of one resource to modify the defined security of the one resource, or adding a new macro defining security for an additional resource; and
  assembling the modified macros to obtain a new load module that includes security information for the resources in the database management system.

2. The method according to claim 1, wherein the data section definition comprises a type selected from one of INITIAL, FINAL, ENTRY, and OCCURRENCE.

3. The method according to claim 1, wherein the data section definition comprises a resource name, a resource type, and an external name.

4. The method according to claim 3, wherein the external name is one of Activity, Application Name, Database Name, Data Definition Name, Environment, Resource External Name, Resource External Type, Schema, SSName, System, and Version.

5. The method according to claim 1, wherein the defined security is one of not secured, internally secured, and externally secured.

6. The method according to claim 1, further comprising the steps of:
  creating a header macro and a corresponding header data section definition; and
  creating a final macro and a corresponding final data section definition.

7. The method according to claim 6, wherein the header data section definition comprises a type of INITIAL and at least one of an environment name, a system profile, a user profile, a user identifier, a service number, and a total number of resources.

8. The method according to claim 6, wherein the final data section definition comprises a type of FINAL.

* * * * *